US006226501B1

(12) United States Patent
Weadon et al.

(10) Patent No.: US 6,226,501 B1
(45) Date of Patent: May 1, 2001

(54) RADIOTELEPHONE HAVING A PRIMARY KEYPAD AND A MOVABLE FLIP COVER THAT CONTAINS A SECONDARY KEYPAD

(75) Inventors: Mark William Weadon, Apex, NC (US); William H. Jennings, Bedford, VA (US); Samuel Kenneth Turner, Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/087,559

(22) Filed: May 29, 1998

(51) Int. Cl.$^7$ ....................................................... H04B 1/38
(52) U.S. Cl. ................................ 455/90; 455/575; 341/22
(58) Field of Search ................................... 455/550, 575, 455/90, 566; 379/428, 433, 440; 341/22; 345/168, 169

(56) References Cited

U.S. PATENT DOCUMENTS

| | | | |
|---|---|---|---|
| 4,939,514 | * 7/1990 | Mayazaki | 341/22 |
| 5,507,013 | * 4/1996 | Weadon et al. | 455/90 |
| 5,659,887 | * 8/1997 | Ooe | 455/90 |
| 5,715,524 | * 2/1998 | Jambhekar et al. | 455/566 |
| 5,742,894 | * 4/1998 | Jambhekar et al. | 455/550 |
| 5,898,758 | * 4/1999 | Rosenberg | 455/90 |
| 5,933,783 | * 8/1999 | Kawakami et al. | 455/550 |

\* cited by examiner

*Primary Examiner*—Edward F. Urban
(74) *Attorney, Agent, or Firm*—Myers Bigel Sibley & Sajovec

(57) ABSTRACT

Radiotelephone flip covers hinged to a radiotelephone housing include a secondary keypad configured to overlie a primary keypad of a radiotelephone. A flip cover is movable between a closed position wherein at least a portion of a primary keypad is covered, and an open position wherein a primary keypad is uncovered. When a flip cover is in a closed position and when a secondary keypad key is depressed by a user, the depressed key in-turn depresses a respective primary keypad key to perform a radiotelephone function.

16 Claims, 5 Drawing Sheets

RADIOTELEPHONE HAVING A PRIMARY KEYPAD AND A MOVABLE FLIP COVER THAT CONTAINS A SECONDARY KEYPAD

FIELD OF THE INVENTION

The present invention relates generally to radiotelephones and, more particularly, to radiotelephones with flip covers.

BACKGROUND OF THE INVENTION

Telecommunications devices, such as radiotelephones, have become increasingly popular for both personal and commercial use. However, with their increase in popularity, radiotelephones have also been undergoing miniaturization to facilitate storage and portability. Indeed, some contemporary radiotelephone models are only 11–12 centimeters in length.

Unfortunately, as radiotelephones become smaller, less area may be available for keypads that users utilize to operate radiotelephones. Accordingly, keypads have also become smaller, thereby causing the size and spacing of keys within keypads to decrease. However, for ergonomic reasons, there is a limit below which it may be undesirable to decrease the size and spacing of keys within a keypad. As a result, further miniaturization of radiotelephones may be constrained because of keypad ergonomic concerns. To accommodate radiotelephone miniaturization, it may become necessary to eliminate certain radiotelephone functions because of lack of space for keys to perform the functions. Alternatively, it may be necessary to require certain keys to perform more than one function. Unfortunately, multi-function keys may be somewhat difficult and confusing to users.

SUMMARY OF THE INVENTION

It is therefore an object of the present invention to accommodate the miniaturization of electronic devices, such as radiotelephones, without compromising keypad functions available to users.

It is another object of the present invention to provide radiotelephones undergoing miniaturization with ergonomic keypads.

These and other objects of the present invention are provided by a radiotelephone including a flip cover hinged to a radiotelephone housing and including a secondary keypad configured to overlie a primary keypad of the radiotelephone. A flip cover is movable between a closed position wherein at least a portion of a primary keypad is covered, and an open position wherein a primary keypad is uncovered. A secondary keypad includes at least one key having a first end extending through a top portion of the flip cover and an opposite second end spaced apart from a primary keypad key when the flip cover is in a closed position. When a secondary keypad key is depressed by a user, a second end of the depressed key engages and depresses a respective primary keypad key.

A primary keypad key, when depressed, performs a first function when a flip cover is in an open position. The same primary keypad key, when depressed via a secondary keypad key, performs a second function when a flip cover is in a closed position. A radiotelephone incorporating aspects of the present invention is capable of detecting flip cover position. Furthermore, a radiotelephone incorporating aspects of the present invention is capable of changing a primary keypad key first function to a different second function in response to movement of a flip cover from an open position to a closed position. Conversely, a radiotelephone incorporating aspects of the present invention is capable of changing a primary keypad key second function to a first function in response to movement of a flip cover from a closed position to an open position.

According to another aspect of the present invention, a flip cover may include a door member having a body portion and a pair of arms attached to, and extending away from, opposite lateral portions thereof. Each pair of arms may be configured to pivotally mount a respective door member to a radiotelephone housing between a closed position and an open position. A secondary keypad extends through a door member body portion. Each key of a secondary keypad has an end configured to operably engage a respective key of a radiotelephone primary keypad when a door member is in a closed position.

Radiotelephones incorporating a secondary keypad within a flip cover according to the present invention may improve radiotelephone functionality without requiring additional primary keypad space. Furthermore, a secondary keypad according to the present invention may eliminate the need for confusing multi-function primary keypad keys. Secondary keypads according to the present invention do not require electronic components within a flip cover for operation. Accordingly, radiotelephone functionality may be improved utilizing existing electronic components.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1A:
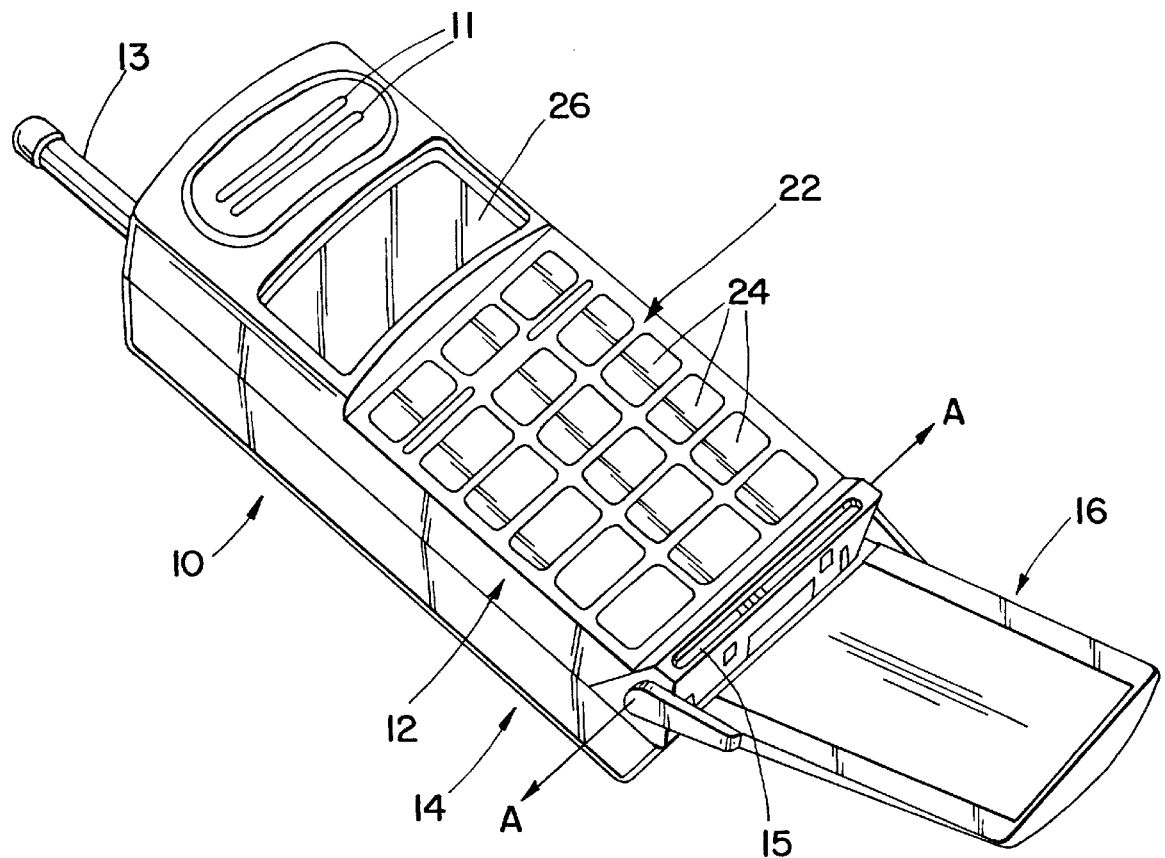
FIG. 1A illustrates an exemplary "flip phone" style radiotelephone within which aspects of the present invention may be incorporated.
Figure 1B:
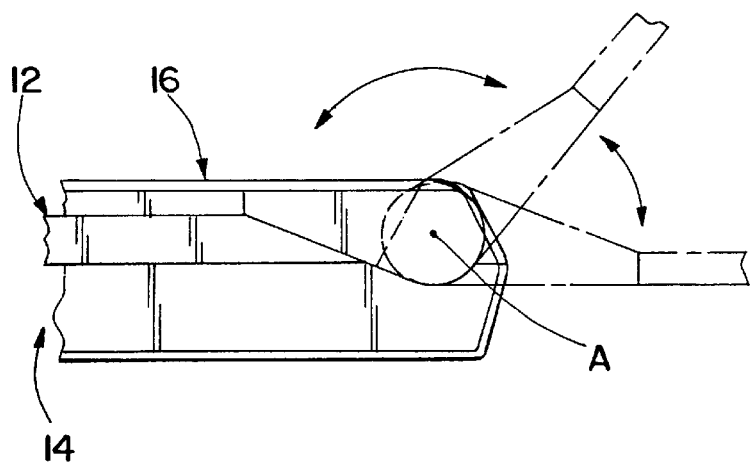
FIG. 1B illustrates movement of the radiotelephone flip cover of FIG. 1A between open and closed positions.

Referring now to FIGS. 1A and 1B, a conventional "flip phone" style radiotelephone 10 is illustrated. The illustrated radiotelephone 10 includes a top handset housing 12 and a bottom handset housing 14 connected thereto to form a cavity therein. Top and bottom handset housings 12 and 14 house a keypad 22 including a plurality of keys 24, a display 26, and electronic components that enable the radiotelephone 10 to transmit and receive telecommunications signals. A flip cover 16 is hinged to one end of the top housing 12, as illustrated.

In operation, the flip cover 16 may be pivoted by a user about axis A between closed and open positions, as illustrated in FIG. 1B. When in a closed position, the flip cover 16 provides protection to the keypad 22 mounted within the top handset housing 12 from unintentional activation or exposure to the elements. When in an open position, the flip cover 16 may provide a convenient extension to the radiotelephone 10 and, when fitted with a microphone, may be favorably positioned to receive audio input from a user. In addition to these tangible benefits, there may also be unqualified consumer appeal for flip covers.

Figure 2:
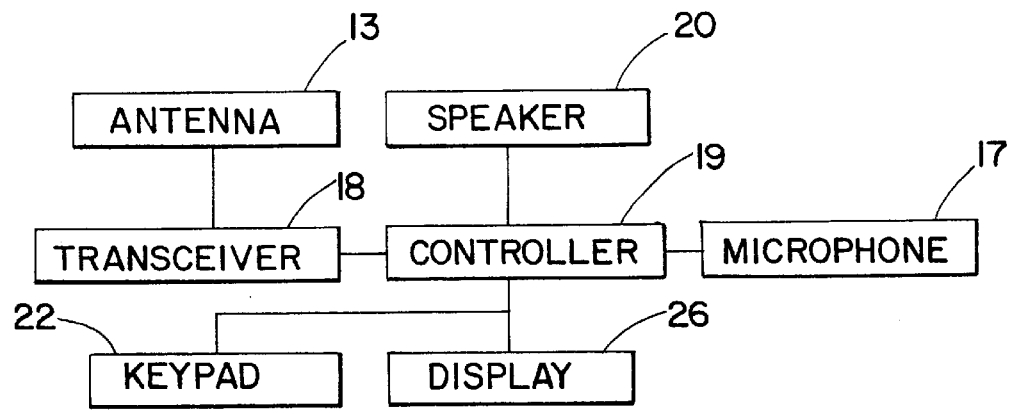
FIG. 2 is a schematic illustration of a conventional arrangement of electronic components for enabling a radiotelephone to transmit and receive telecommunications signals.

A conventional arrangement of electronic components that enable a radiotelephone to transmit and receive telecommunications signals is shown schematically in FIG. 2, and is understood by those skilled in the art of radiotelephone communications. An antenna 13 (also visible in FIG. 1A) for receiving and transmitting telecommunication signals is electrically connected to a radio-frequency transceiver 18 that is further electrically connected to a controller 19, such as a microprocessor. The controller 19 is electrically connected to a speaker 20 that transmits a remote signal from the controller 19 to a user of a radiotelephone. The controller 19 is also electrically connected to a microphone 17 that receives a voice signal from a user and transmits the voice signal through the controller 19 and transceiver 18 to a remote device. The controller 19 is electrically connected to a keypad 22 and display 26 that facilitate radiotelephone operation.

Referring back to FIG. 1A, slots 11 may be provided at one end of the radiotelephone 10 for allowing a user to hear audio communications via a speaker enclosed within the top and bottom handset housings 12, 14. One or more slots 15 may also be provided at an opposite end of the radiotelephone 10 for allowing a user to speak into a microphone enclosed within the top and bottom handset housings 12, 14. When open, the flip cover 16 may direct sound from a user towards the microphone slots 15. When the flip cover 16 is closed, sound from a user may pass through a slot (not shown) between the flip cover and the top handset housing 12, as is known to those skilled in the art. Accordingly, a user may operate a radiotelephone with a flip cover in either an open or closed position.

Figure 3:
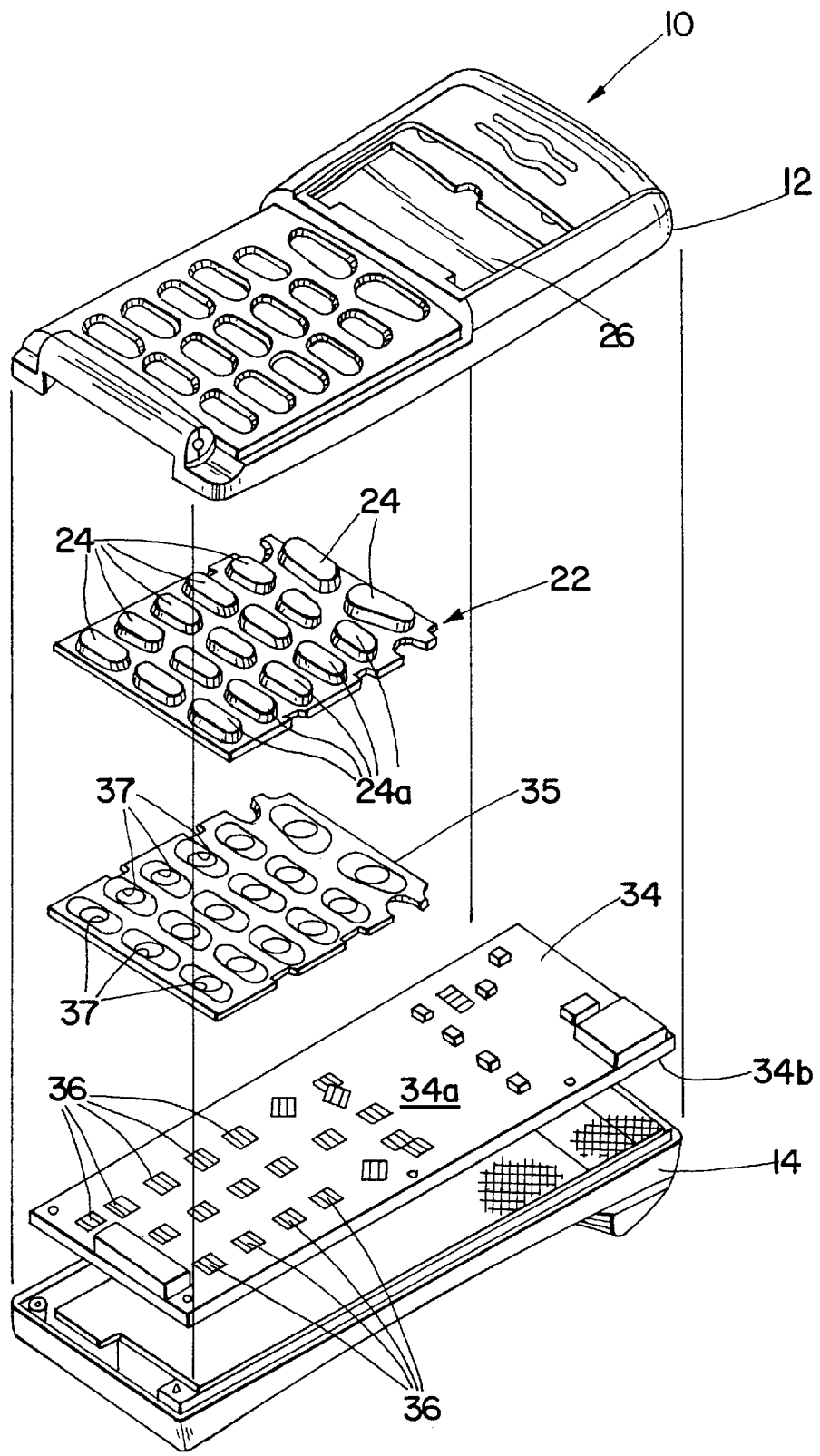
FIG. 3 is an exploded perspective view of a primary keypad and other internal components contained within top and bottom housings of a radiotelephone, according to the present invention.

Referring now to FIG. 3, an exploded perspective view of various internal components contained within the top and bottom housings 12 and 14 of a radiotelephone 10 according to the present invention is provided. Illustrated components include a circuit board 34, a polydome substrate 35, and primary keypad 22. As is known to those skilled in the art, various electronic components that enable a radiotelephone 10 to transmit and receive telecommunications signals may be mounted on the circuit board 34. The illustrated circuit board includes a face 34a having a plurality of contact pads 36 located thereon. The contact pads 36 are positioned so that a respective contact pad is positioned beneath a respective key 24 of an overlying primary keypad 22. Preferably, the polydome substrate 35 provides tactile response for the keys 24 of the primary keypad 22, as is understood by those skilled in the art.

Each illustrated primary keypad key 24 has a first end 24a configured to extend through the top housing portion 12 for user access, and a second end (not shown) opposite the first end. When pressed by a user, each key second end is configured to extend through a respective opening 37 in the polydome substrate 35 and to be operably engageable with a respective contact pad 36 on the circuit board face 34a. As is known to those skilled in the art of radiotelephones, a predetermined radiotelephone function is performed when a second end of a key makes contact with a respective contact pad 36.

Figure 4A:
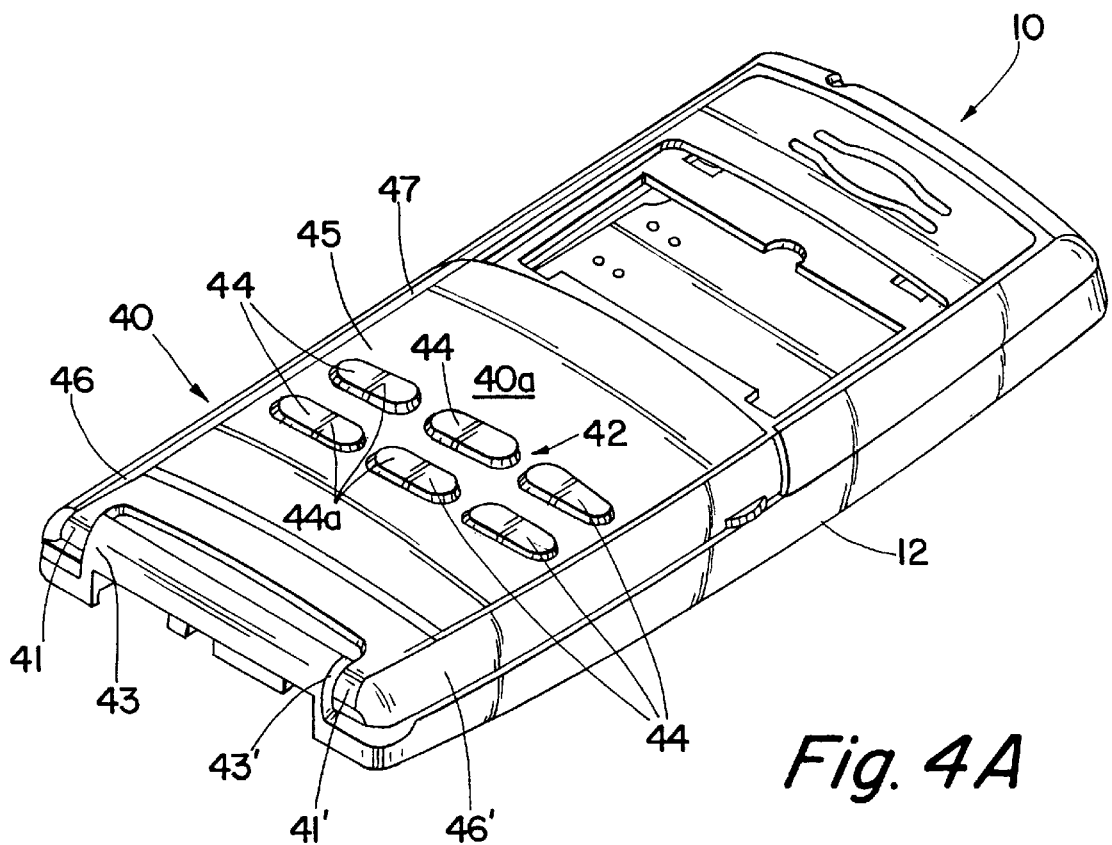
FIG. 4A illustrates the radiotelephone of FIG. 3 incorporating a flip cover with a secondary keypad according to the present invention, and wherein the flip cover is in a closed position overlying a primary keypad.
Figure 4B:
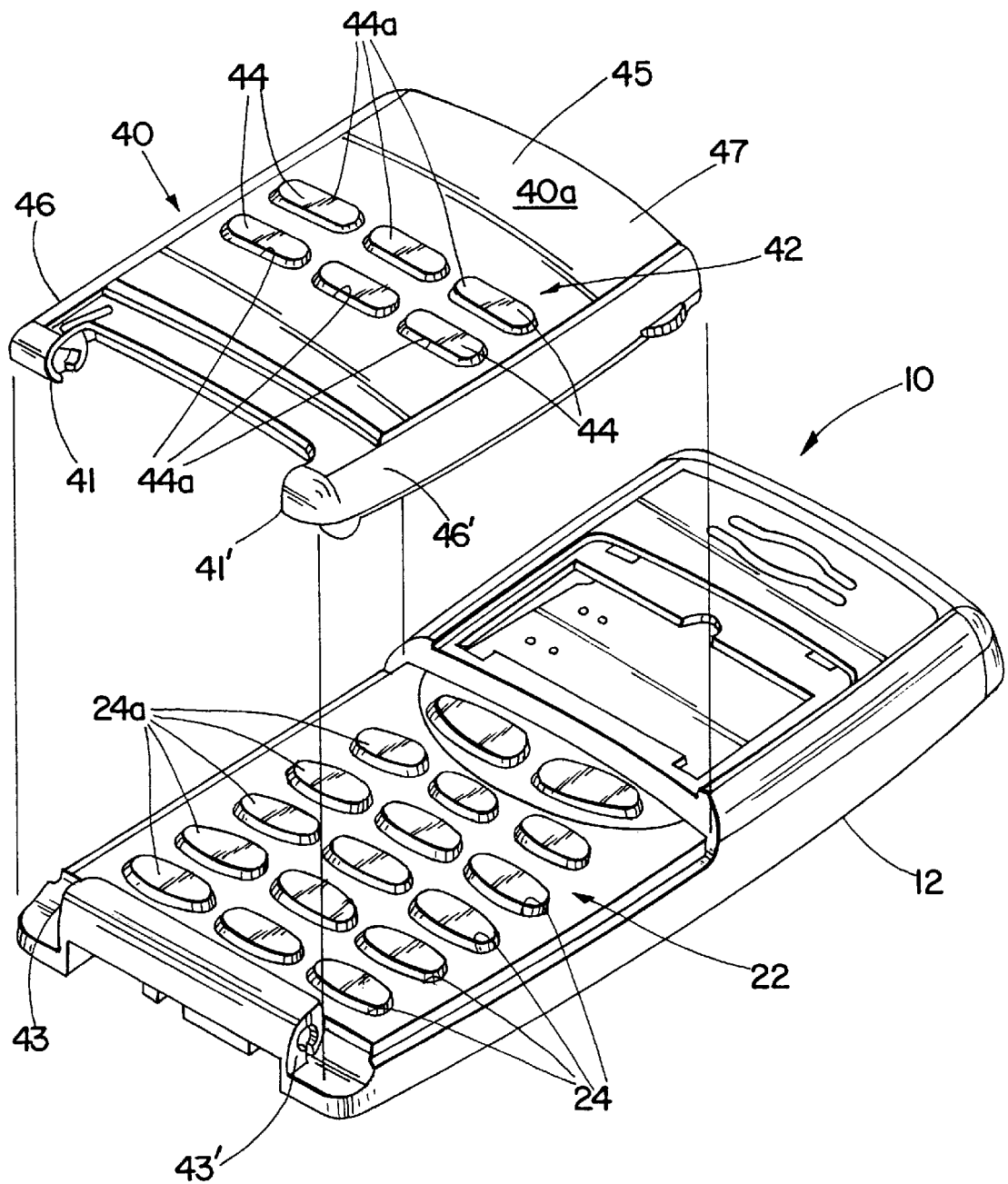
FIG. 4B is an exploded perspective view of the radiotelephone and flip cover of FIG. 4A.
Figure 4C:
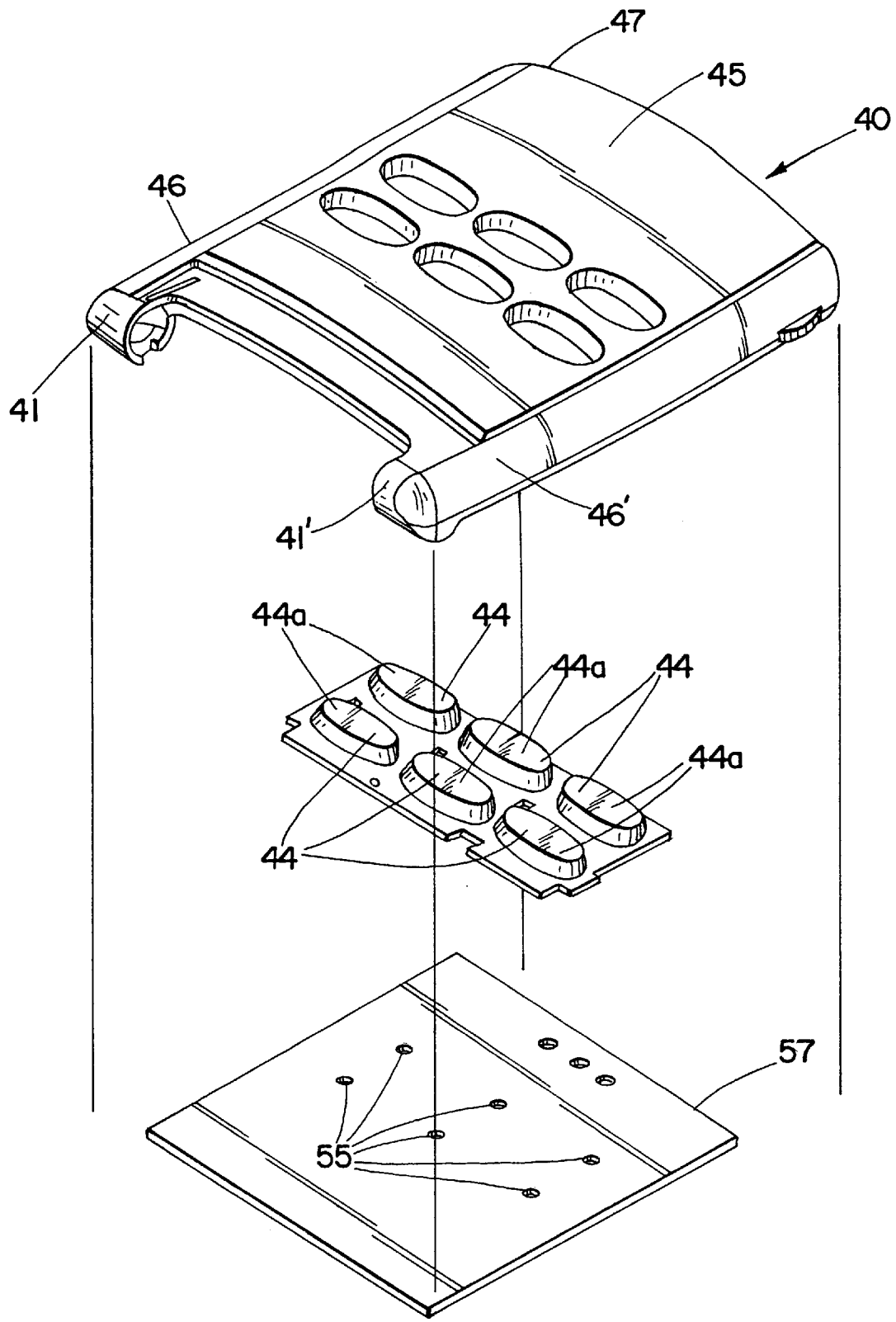
FIG. 4C is an exploded perspective view of the flip cover of FIG. 4A.

Referring now to FIGS. 4A–4C, the radiotelephone 10 of FIG. 3 is illustrated with a flip cover 40 incorporating a secondary keypad 42 according to the present invention. The flip cover 40 includes a door member 45 having a body portion 47 pivotally attached to the top housing portion 12 via pivot arms 41 and 41' which extend away from lateral portions 46 and 46', as illustrated. Pivot arms 41 and 41' cooperate with respective end portions 43 and 43' of the top housing portion 12 to pivot the flip cover 40 between open and closed positions.

When in the closed position illustrated in FIG. 4A, the secondary keypad 42 housed within the flip cover 40 is accessible to a user for performing various radiotelephone functions. The primary keypad (22 of FIG. 4B) is not directly accessible to a user when the illustrated flip cover 40 is in a closed position, except as described below. When the flip cover 40 is in an open position, a user has full access to the keys 24 of the primary keypad 22. It is to be understood that the present invention is not limited to the illustrated embodiment. A flip cover according to the present invention may cover an entire primary keypad, as illustrated in FIG. 4A, or may cover only a portion of a primary keypad.

In the illustrated embodiment, the secondary keypad 42 includes a plurality of keys 44 arranged in two rows. However, it is to be understood that various numbers and configurations of keys in a secondary keypad may be provided. Each secondary keypad key 44 has a first end 44a configured to extend through the top face 40a of the flip cover body portion 47 for user access, and a second end (not shown) opposite the first end 44a that extends through a respective opening 55 in a flip label substrate 57 (FIG. 4C). The flip label substrate 57 helps maintain the secondary keypad 42 securely within the flip cover 40.

The second end of each secondary keypad key 44 is operably engageable with a respective key 24 of the primary keypad 22 extending through the top housing portion 12. When the flip cover 40 is in a closed position and a user presses a key 44 of the secondary keypad 42, the second end of the pressed key extends through the flip label 57, makes contact with and depresses a respective underlying key 24 of the primary keypad 22. The depressed key 24 of the primary keypad makes contact with an underlying contact pad 36 on the circuit board face 34a to perform a specified function.

A transceiver within a radiotelephone incorporating a flip cover and secondary keypad according to the present invention is preferably aware of a position of a flip cover (i.e., whether a flip cover is open or closed). Various methods of detecting the position of a flip cover are known to those skilled in the art of radiotelephones and need not be discussed herein. According to the present invention, when a flip cover is closed, a radiotelephone transceiver is preferably aware that a secondary keypad overlies a primary keypad and accordingly may assign a different function to selected keys of the primary keypad. When a flip cover is open, a radiotelephone transceiver is preferably aware that the flip cover is open and keys of the primary keypad preferably revert to their default functions.

For example, primary keypad keys having overlying secondary keypad keys 44, as illustrated in FIG. 4A, may be the "4", "5", "6", "7", "8" and "9" keys. When the flip cover 40 is in an open position and these primary keypad keys are pressed by a user, signals corresponding to a "4", "5", "6", "7", "8" and "9" are respectively generated by the radiotelephone electronics. However, when the flip cover 40 is in a closed position as illustrated in FIG. 4A, the "4", "5", "6", "7", "8" and "9" primary keypad keys may have different functions and may generate different signals when pressed via the secondary keypad keys. For example, the "4" key of the primary keypad may serve as a "volume increase" key to increase volume through the radiotelephone speaker. Similarly, the "5" key of the primary keypad may serve as a "volume decrease" key to decrease volume through the radiotelephone speaker. However, when the flip cover 40 is pivoted to an open position, the "4" and "5" keys preferably revert to their default functions (i.e., "4" and "5").

Preferably, functions of primary and secondary keypad keys may be assigned and modified by radiotelephone users. For example, one user may assign the "4" primary keypad key with the function of "increase volume" while another user may assign the "4" primary keypad key with the function of "redial last number".

In operation, a user may pivot the flip cover 40 to an open position and dial a telephone number with the primary keypad to place a call. The user may then close the flip cover 40 as illustrated in FIG. 4A and utilize the secondary keypad for various user-assigned or predefined functions. Accordingly, the secondary keypad 42 compliments the primary keypad 22 by providing additional functionality without requiring additional primary keypad space in the upper housing 12 and without requiring a user to learn multiple functions of a primary keypad key. Furthermore, additional electronics within the flip cover are not required for secondary keypad operation.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A radiotelephone comprising:
    a housing configured to enclose electronic components that transmit and receive radiotelephone communications signals;
    a primary keypad comprising a plurality of keys, each of the plurality of keys having a first end extending through a top portion of said housing and a second end, opposite said first end;
    a flip cover hinged to said housing and movable between a closed position wherein said flip cover covers at least a portion of said primary keypad, and an open position wherein said primary keypad is uncovered, said plurality of keys of said primary keypad maintaining a configuration that is independent of the position of said flip cover; and
    a secondary keypad comprising at least one key, said at least one key comprising a first end extending through a top portion of said flip cover and an opposite second end spaced apart from a key of said primary keypad when said flip cover is in said closed position, wherein said at least one key second end is configured to engage and depress said primary keypad key.

2. A radiotelephone according to claim 1 wherein said primary keypad key, when depressed, performs a first function when said flip cover is in said open position, and wherein said primary keypad key, when depressed via a secondary keypad key, performs a second function when said flip cover is in said closed position.

3. A radiotelephone according to claim 2 further comprising means for changing said primary keypad key first function to said second function in response to movement of said flip cover from said open position to said closed position.

4. A radiotelephone according to claim 2 further comprising means for changing said primary keypad key second function to said first function in response to movement of said flip cover from said closed position to said open position.

5. A radiotelephone according to claim 1 wherein said at least one secondary keypad key comprises a plurality of keys and wherein a respective one of said plurality of keys are configured to depress a respective primary keypad key when said flip cover is in said closed position.

6. A radiotelephone according to claim 1 wherein primary keypad key functions when said flip cover is in said closed position are user configurable.

7. A radiotelephone according to claim 1 wherein said flip cover covers said primary keypad entirely.

8. A radiotelephone according to claim 1 further comprising a substrate configured to maintain said secondary keypad within said flip cover in a secure position, said substrate having at least one aperture formed therethrough and through which said second end of said at least one key is extendable to depress said primary keypad key.

9. An electronic device, comprising:
    a housing configured to enclose electronic components;
    a primary keypad comprising a plurality of keys, each of the plurality of keys having a first end extending through a top portion of said housing and a second end, opposite said first end;
    a flip cover hinged to said housing and movable between a closed position wherein said flip cover covers at least a portion of said primary keypad, and an open position wherein said primary keypad is uncovered, said plurality of keys of said primary keypad maintaining a configuration that is independent of the position of said flip cover; and
    a secondary keypad comprising at least one key, said at least one key comprising a first end extending through a top portion of said flip cover and an opposite second end spaced apart from a key of said primary keypad when said flip cover is in said closed position, wherein said at least one key second end is configured to engage and depress said primary keypad key.

10. An electronic device according to claim 9 wherein said primary keypad key, when depressed, performs a first function when said flip cover is in said open position, and wherein said primary keypad key, when depressed via a secondary keypad key, performs a second function when said flip cover is in said closed position.

11. An electronic device according to claim 10 further comprising means for changing said primary keypad key first function to said second function in response to movement of said flip cover from said open position to said closed position.

12. An electronic device according to claim 10 further comprising means for changing said primary keypad key second function to said first function in response to movement of said flip cover from said closed position to said open position.

13. An electronic device according to claim 9 wherein said at least one secondary keypad key comprises a plurality of keys and wherein each of said plurality of keys are configured to depress a respective primary keypad key when said flip cover is in said closed position.

14. An electronic device according to claim 9 wherein primary keypad key functions when said flip cover is in said closed position are user configurable.

15. An electronic device according to claim 9 wherein said flip cover covers said primary keypad entirely.

16. An electronic device according to claim 9 further comprising a substrate configured to maintain said secondary keypad within said flip cover in a secure position, said substrate having at least one aperture formed therethrough and through which said second end of said at least one key is extendable to depress said primary keypad key.

* * * * *